United States Patent
Kwon

(10) Patent No.: US 9,372,661 B2
(45) Date of Patent: Jun. 21, 2016

(54) APPARATUS AND METHOD OF GENERATING A SOUND EFFECT IN A PORTABLE TERMINAL

(71) Applicant: Samsung Electronics Co., Ltd., Gyeonggi-do (KR)

(72) Inventor: Dong-Wook Kwon, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 159 days.

(21) Appl. No.: 13/786,130

(22) Filed: Mar. 5, 2013

(65) Prior Publication Data

US 2013/0263004 A1    Oct. 3, 2013

(30) Foreign Application Priority Data

Apr. 2, 2012  (KR) .................. 10-2012-0033874

(51) Int. Cl.
- *G06F 3/0481* (2013.01)
- *G06F 3/16* (2006.01)
- *G06F 3/043* (2006.01)
- *G06F 3/0354* (2013.01)

(52) U.S. Cl.
CPC ............. *G06F 3/16* (2013.01); *G06F 3/03545* (2013.01); *G06F 3/0433* (2013.01); *G06F 3/167* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,138,660 A * | 8/1992 | Lowe | .................. | H04S 5/00 381/17 |
| 5,287,088 A * | 2/1994 | Sills | ................. | G10H 1/0008 345/581 |
| 5,321,794 A * | 6/1994 | Tamura | ............... | G10H 7/00 704/260 |
| 5,641,931 A * | 6/1997 | Ogai | ................. | G10H 1/125 84/659 |
| 7,703,047 B2 * | 4/2010 | Keely, Jr. | .......... | G06F 3/0483 715/769 |
| 7,999,169 B2 * | 8/2011 | Kayama | ................... | 84/622 |
| 2005/0237311 A1 * | 10/2005 | Nakajima | ....... | G06F 3/04883 345/173 |
| 2006/0279559 A1 * | 12/2006 | Kongqiao | ...... | G06F 3/04883 345/179 |
| 2008/0289482 A1 * | 11/2008 | Nakamura | ................. | 84/645 |
| 2009/0079703 A1 * | 3/2009 | Kyung et al. | ........... | 345/173 |
| 2011/0102349 A1 | 5/2011 | Harris | | |
| 2011/0320204 A1 * | 12/2011 | Locker et al. | ............ | 704/260 |
| 2012/0260208 A1 * | 10/2012 | Jung | ............... | G06F 3/04886 715/773 |

FOREIGN PATENT DOCUMENTS

| | | |
|---|---|---|
| CN | 101989284 A | 3/2011 |
| JP | 2006031410 A | 2/2006 |
| JP | 2011085400 A | 4/2011 |
| KR | 10-0769981 | 10/2007 |
| KR | 20090030435 | 3/2009 |

(Continued)

OTHER PUBLICATIONS

Notice of Patent Grant (with English translation) dated Apr. 29, 2014 in connection with Korean Patent Application No. 10-2012-0033874; 6 pp.

(Continued)

*Primary Examiner* — Phenuel Salomon

(57) ABSTRACT

An apparatus and method of a portable terminal outputting a sound effect are provided. An operation method of the portable terminal includes sensing an input, identifying a handwriting tool used for the input and a handwriting face displayed, and outputting a sound that mimics an actual handwriting operation of the portable terminal.

17 Claims, 12 Drawing Sheets

(56) References Cited

FOREIGN PATENT DOCUMENTS

KR          20090096833 A      9/2009
WO    WO 2013/173187 A2      11/2013

OTHER PUBLICATIONS

Extended European Search Report dated Apr. 8, 2014 in connection with European Patent Application No. 13162020.5; 8 pp.

Muller-Tomfelde, et al.; "Modeling and Sonifying Pen Strokes on Surfaces"; COST G-6 Conference on Digital Audio Effects (DAFX-01); Limerick, Ireland; Dec. 6-8, 2001; 5 pp.

Translated Korean Office Action dated Oct. 23 2013 in connection with Korean Patent Application No. 10-2012-0033874; 7 pages.

Detailed First Office Action dated Jul. 1, 2015 in connection with Chinese Patent Application No. 2013-101101842; 20 pages.

Chinese Office Action issued for CN 201310110184.2 dated Mar. 4, 2016, 19 pgs.

* cited by examiner

APPARATUS AND METHOD OF GENERATING A SOUND EFFECT IN A PORTABLE TERMINAL

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Apr. 2, 2012 and assigned Serial No. 10-2012-0033874, the contents of which are herein incorporated by reference.

TECHNICAL FIELD OF THE INVENTION

The present invention relates generally to portable terminals, and more particularly, to an apparatus and method of generating a sound effect in a portable terminal.

BACKGROUND OF THE INVENTION

As demand for portable terminals increases, users are making widespread use of the portable terminals. That is, the portable terminals have become items essential to users because they are not only simply used for making a call but also can provide various services to the users.

Accordingly, a time during which a user carries a portable terminal is getting long by degrees and also, various desires for the portable terminals are increasing. For example, to meet consumer's desires, portable terminals have introduced on the market in which users can feel tactile sensation upon touch. Also, portable terminals have introduced on the market in which the users can perform pen input using input devices such as styluses and the like. To sense a user's touch input, there are provided so-called resistive film scheme, capacitive scheme, ultrasonic scheme, infrared ray scheme, and the like. Portable terminals having a pen input are particularly using the typical Electro-Magnetic Resonance (EMR) scheme and, besides this, are using even a pen-input sense scheme.

Although portable terminals providing satisfaction to users' eyesight and tactile sensation have been developed, portable terminals giving satisfaction to users' auditory desires have not yet been provided. That is, at a time a user inputs certain information to a portable terminal, the portable terminal cannot provide a visual sound such as a sound effect, causing a failure to satisfy various desires of a consumer.

SUMMARY OF THE INVENTION

To address the above-discussed deficiencies of the prior art, it is a primary object to provide an apparatus and method configured to, when a user inputs information to a portable terminal using an input device, generate a sound effect that mimics an actual handwriting operation in the portable terminal.

Another aspect of the present invention is to provide an apparatus and method configured to satisfy various desires of a user since the user can directly select a texture of a handwriting face of a portable terminal, the kind of the handwriting face, and a color of the handwriting face in the portable terminal.

A further aspect of the present invention is to provide an apparatus and method configured to satisfy various desires of a user since the user can directly select the kind of a handwriting tool of an input device, a thickness of the handwriting tool, and a color of the handwriting tool in the portable terminal.

Yet another aspect of the present invention is to provide an apparatus and method configured to, instead of providing a restricted sound effect, outputting various sound effects according to a combination of a handwriting face of a portable terminal and a handwriting tool of an input device in the portable terminal.

The above aspects are achieved by providing an apparatus and method of a portable terminal configured to generate a sound effect.

According to one aspect of the present invention, an operation method of a portable terminal is provided. The method includes sensing an input, identifying a handwriting tool used for the input and a handwriting face displayed, and outputting a sound that mimics an actual handwriting operation of the portable terminal.

According to another aspect of the present invention, an apparatus of a portable terminal is provided. The apparatus includes a sensor unit for sensing an input, a controller for identifying a handwriting tool used for the input and a handwriting face displayed, and a sound output unit for outputting a sound that mimics an actual handwriting operation of the portable terminal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Preferred embodiments of the present invention will be described herein below with reference to the accompanying drawings. In the following description, well-known functions or constructions are not described in detail since they would obscure the invention in unnecessary detail. Also, parts performing like function and operations are denoted by the same symbols throughout the drawings.

Figure 1:
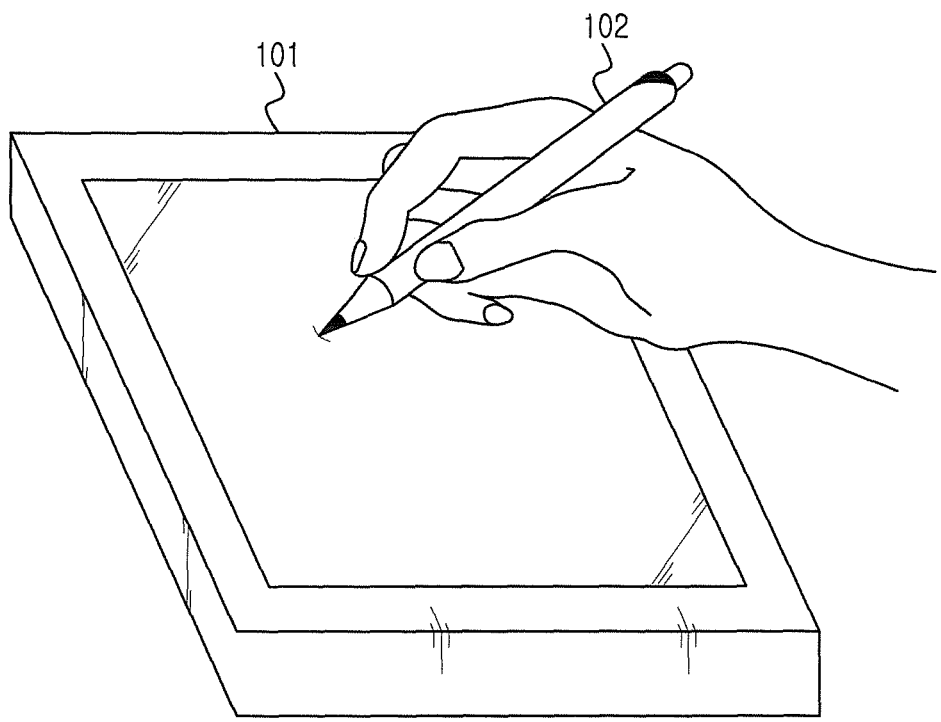
FIG. 1 illustrates an example portable terminal and an input device according to embodiments of the present invention.

FIG. 1 is a diagram illustrating the whole construction of a portable terminal and an input device according to embodiments of the present invention.

As illustrated in FIG. 1, the portable terminal 101 receives an input of certain information from the input device 102, and outputs a sound effect according to a combination of a handwriting face and a handwriting tool that are set by a user. In detail, the user directly selects a texture of the handwriting face of the portable terminal 101, the kind of the handwriting face thereof, a color of the handwriting face thereof and the like, and the portable terminal 101 displays the handwriting face of the selected texture, kind, and color on a display unit. Also, the user directly selects the texture of the handwriting tool of the input device 102, the kind of the handwriting tool thereof, the color of the handwriting tool thereof and the like. After that, if the user inputs certain information to the handwriting face selected by the user with the handwriting tool of the input device 102, the portable terminal 101 outputs a sound effect according to a combination of the handwriting face and the handwriting tool.

Here, the handwriting face that is displayed on the display unit of the portable terminal 101 receives an input from the handwriting tool of the input device 102. In detail, if the user directly selects the texture of the handwriting face of the portable terminal 101, the kind of the handwriting face, the color of the handwriting face, and the like, the portable terminal 101 combines the respectively selected texture, kind, color and the like of the handwriting face and displays the combined handwriting face on the display unit. For example, because a smooth texture, a coarse texture and the like have been previously stored as the texture of the handwriting face of the portable terminal 101, if receiving a selection of a particular texture from the user, the portable terminal 101 can use the selected texture as the texture of the handwriting face. Also, because a general paper, a whiteboard, a board, a brick and the like are previously stored as the kind of the handwriting face of the portable terminal 101, if receiving a selection of a particular kind from the user, the portable terminal 101 can use the selected kind as the kind of the handwriting face. Also, because various colors are previously stored as the color of the handwriting face of the portable terminal 101, if receiving a selection of a particular color from the user, the portable terminal 101 can use the selected color as the color of the handwriting face.

Here, the handwriting tool of the input device comprises a tool for inputting certain information on the handwriting face displayed by the portable terminal 101. In detail, the user directly selects the kind of the handwriting tool, a thickness of the handwriting tool, a color of the handwriting tool and the like, and inputs certain information on the handwriting face displayed in the portable terminal 101 with the selected handwriting tool. For example, because a pencil, a fountain pen, a ball pen, a felt-tipped pen, a board marker, a chalk and the like are previously stored as the kind of the handwriting tool of the input device 102, if receiving a selection of a particular kind from the user, the portable terminal 101 can use the selected kind as the handwriting tool. Also, because the thickness of the handwriting tool can be set to be thin or thick according to user's fancy, if receiving a selection of a particular thickness of the handwriting tool from the user, the portable terminal 101 can use the selected thickness as the thickness of the handwriting tool. As the user sets the thickness of the handwriting tool to be relatively thin, the portable terminal 101 outputs a sound effect of a higher frequency. Also, because various colors are previously stored as the color of the handwriting tool of the input device 102, if receiving a selection of a particular color from the user, the portable terminal 101 can use the selected color as the color of the handwriting tool.

As described above, a portable terminal displays a handwriting face combining a texture of the handwriting face set directly by a user, the kind of the handwriting face, a color of the handwriting face and the like, and the portable terminal receives an input from a handwriting tool combining the kind of the handwriting tool of an input device set by the user, a thickness of the handwriting tool, and a color of the handwriting tool. In detail, after the handwriting face and the handwriting tool are set by the user, if the handwriting face of the portable terminal receives an input of certain information from the handwriting tool, the portable terminal outputs a sound effect combining the handwriting face and the handwriting tool. For example, if the user selects a coarse texture as the texture of the handwriting face, selects a whiteboard as the kind of the handwriting face, and selects white as the color of the handwriting face. Also, if the user selects a board marker as the kind of the handwriting tool, sets the thickness of the handwriting tool thinly, and selects black as the color of the handwriting tool. When the user inputs certain information to the handwriting face with the handwriting tool, the portable terminal outputs a sound effect synthesizing a sound matching with the handwriting face and a sound that mimics the handwriting tool. In detail, the portable terminal 101 reads a first sound matching with the texture and kind of the handwriting face, reads a second sound matching with the kind and thickness of the handwriting tool, and outputs a sound effect synthesizing the read first and second sounds. The aforementioned example is described in detail. The portable terminal outputs a sound effect synthesizing the first sound that is a synthesis of sounds that mimics the whiteboard of the coarse texture and the second sound that is a synthesis of sounds that mimics the board marker having a relatively thin thickness. As described above, the portable terminal may read the respective first and second sounds and output a sound effect synthesizing the read first and second sounds, or the portable terminal may previously store a sound effect matching with each combination of the kind and thickness of the handwriting tool and the texture and kind of the handwriting face, read the sound effect matching with each combination, and output the read sound effect. For example, the portable terminal may output a sound effect that mimics a combination of the whiteboard of the coarse texture and the board marker of the thin thickness.

The input device 102 is defined as a device for previously setting a handwriting tool of the input device 102 and inputting certain information to a handwriting face of the portable terminal 101 with the set handwriting tool. In detail, a user directly selects the kind of the handwriting tool, a thickness of the handwriting tool, a color of the handwriting tool and the like and inputs certain information to the handwriting face displayed in the portable terminal 101 with the selected handwriting tool. For example, because a pencil, a fountain pen, a ball pen, a felt-tipped pen, a board marker, a chalk and the like are previously stored as the kind of the handwriting tool of the input device 102, if receiving a selection of a particular kind from the user, the portable terminal 101 can use the selected kind as the handwriting tool. Also, because the thickness of the handwriting tool can be set thin or thick according to user's fancy, if receiving a selection of a particular thickness of the handwriting tool from the user, the portable terminal 101 can use the selected thickness as the thickness of the handwriting tool. As the user sets the thickness of the handwriting tool thinner, the portable terminal 101 outputs a sound effect of a higher frequency. Also, because various colors are previously stored as the color of the handwriting tool of the input device 102, if receiving a selection of a particular color from the user, the portable terminal 101 can use the selected color as the color of the handwriting tool.

The user may directly input the kind of the handwriting tool, the thickness of the handwriting tool, and the color of the handwriting tool to the portable terminal 101, or the portable terminal 101 can transmit/receive data about the handwriting tool of the input device 102 with the input device 102 by a local area communication. In detail, although the user does not directly input information about the handwriting face and the handwriting tool to the portable terminal 101, the user can set the information about the handwriting face and the handwriting tool through a local area communication between the portable terminal 101 and the input device 102, using a button and the like of the input device 102. As described above, to describe this example embodiment, the input device 102 has been set and described. But, it is not essential that the input device 102 should be used in setting for outputting a sound effect according to embodiments of the present invention. For example, a user's finger can be used for carrying out input. In other words, in a case of an apparatus with a touch screen employing a finger-touch input sensing scheme, even when the user performs input with his/her finger, it is possible that the user expresses the set kind and thickness of the handwriting tool, because setting and expressing of the kind and thickness of the handwriting tool are performed in the portable terminal. That is, to describe an example embodiment of the present invention, a description is made below by way of an example of inputting with the input device 102. But, it is apparent that the input device 102 is not essential.

Figure 2:
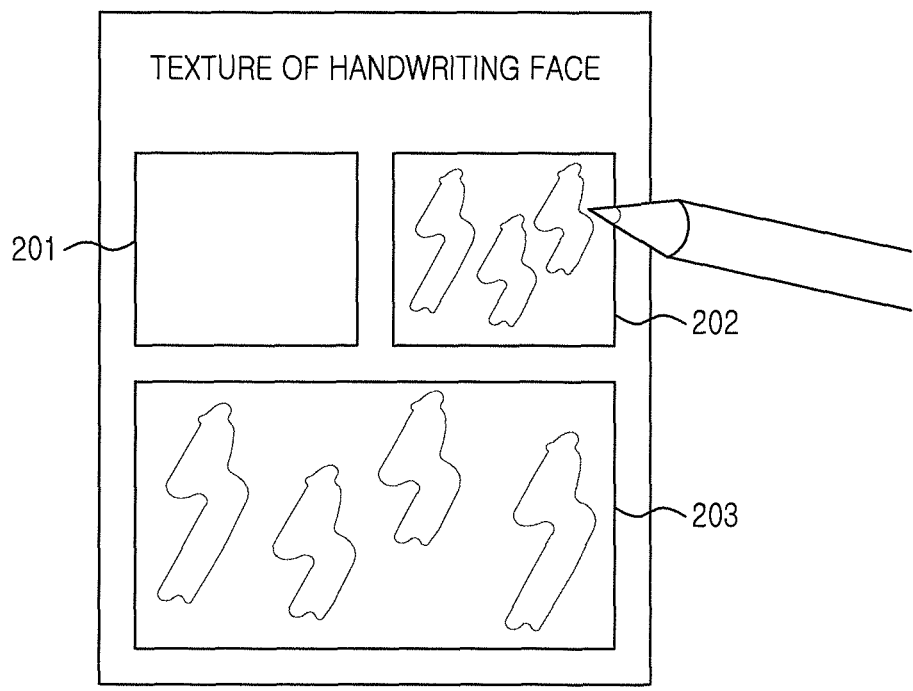
FIG. 2 illustrates an example embodiment of selecting a texture of a handwriting face according to embodiments of the present invention.

FIG. 2 is a diagram illustrating an example embodiment of selecting a texture of a handwriting face according to embodiments of the present invention.

First, although not illustrated in FIG. 2, a user selects a menu of a handwriting face to select a texture of the handwriting face. If the menu of the handwriting face is selected by the user, a portable terminal displays respective buttons for the texture of the handwriting face, the kind of the handwriting face, and a color of the handwriting face on a display unit of the portable terminal so that the user can select the texture of the handwriting face, the kind of the handwriting face, and the color of the handwriting face. After that, if the user selects the button for the texture of the handwriting face to set the texture of the handwriting face, as illustrated in FIG. 2, the portable terminal displays textures of the handwriting face on the display unit. Here, the textures of the handwriting face can be previously stored in the portable terminal, or new textures of the handwriting face can be downloaded and stored using a particular application.

If the button for the texture of the handwriting face is selected by the user, the portable terminal can display the textures of the handwriting face and receive a selection of a particular texture of the handwriting face from the user. As the texture of the handwriting face exemplified in FIG. 2, there are a smooth texture 201 and a coarse texture 202. That is, after the portable terminal displays the smooth texture 201 and the coarse texture 202 as the texture of the handwriting face, the portable terminal receives a selection of any one texture among the smooth texture 201 and the coarse texture 202 from the user. As illustrated in FIG. 2, if the portable terminal receives a selection of the coarse texture 202 from the user, the portable terminal displays the coarse texture 202 selected by the user under the display unit of the portable terminal so that the user can identify the selected coarse texture 202. In this example embodiment, because the portable terminal receives the selection of the coarse texture 202 from the user, the portable terminal displays the coarse texture 202 under the display unit as denoted by reference numeral 203.

Figure 3:
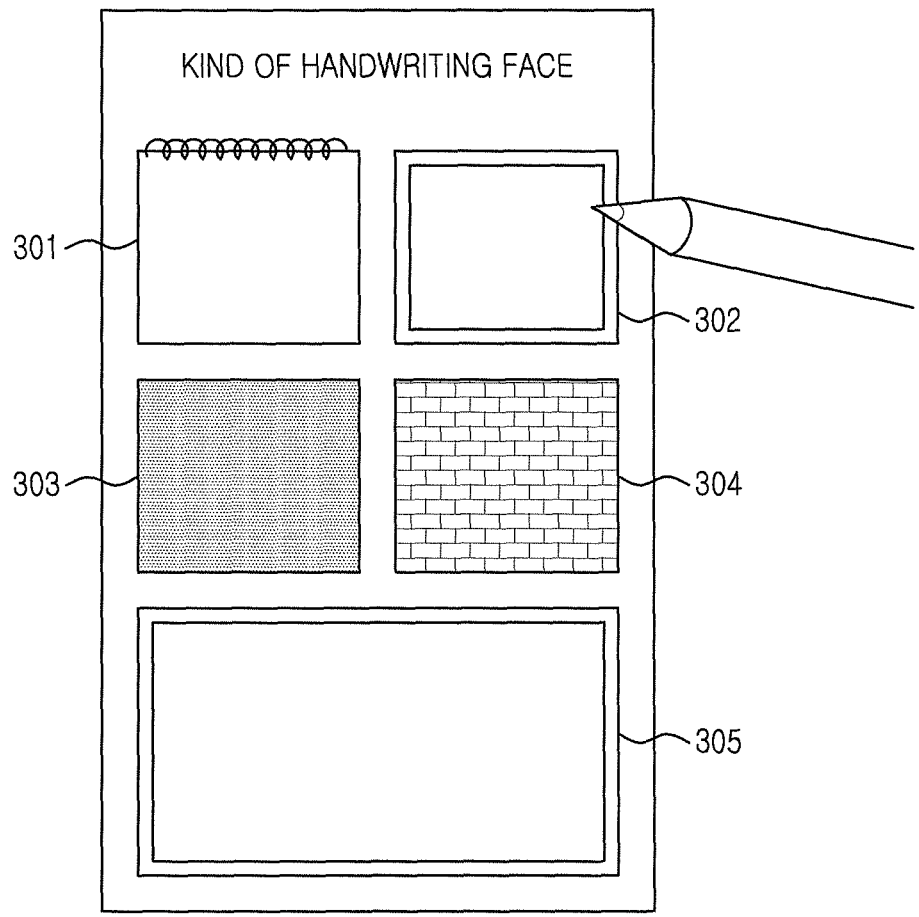
FIG. 3 illustrates an example embodiment of selecting the kind of a handwriting face according to embodiments of the present invention.

FIG. 3 is a diagram illustrating an example embodiment of selecting the kind of a handwriting face according to embodiments of the present invention.

First, although not illustrated in FIG. 3, a user selects a menu of a handwriting face to select the kind of the handwriting face. If the menu of the handwriting face is selected by the user, a portable terminal displays respective buttons for a texture of the handwriting face, the kind of the handwriting face, and a color of the handwriting face on a display unit of the portable terminal so that the user can select the texture of the handwriting face, the kind of the handwriting face, and the color of the handwriting face. After that, if the user selects the button for the kind of the handwriting face to set the kind of the handwriting face, as illustrated in FIG. 3, the portable terminal displays the kind of the handwriting face on the display unit. Here, the kind of the handwriting face can be previously stored in the portable terminal, or the new kind of the handwriting face can be downloaded and stored using a particular application.

If the button for the kind of the handwriting face is selected by the user, the portable terminal can display the kind of the handwriting face and receive a selection of a particular kind of the handwriting face from the user. FIG. 3 illustrates an example embodiment of displaying the kind of the handwriting face to receive a selection of a particular handwriting face from the user. As illustrated in FIG. 3, the portable terminal displays a paper 301, a whiteboard 302, a board 303, and a brick 304 as the kind of the handwriting face. As in an example embodiment illustrated in FIG. 3, if the portable terminal receives a selection of the whiteboard 302 as the kind of the handwriting face from the user, the portable terminal displays the kind (i.e., the whiteboard 302) selected by the user under the display unit so that the user can identify the selected kind (i.e., the whiteboard 302). In this example embodiment, because the portable terminal receives the selection of the whiteboard 302 from the user, the portable terminal displays the whiteboard 302 under the display unit as denoted by reference numeral 305.

Figure 4:
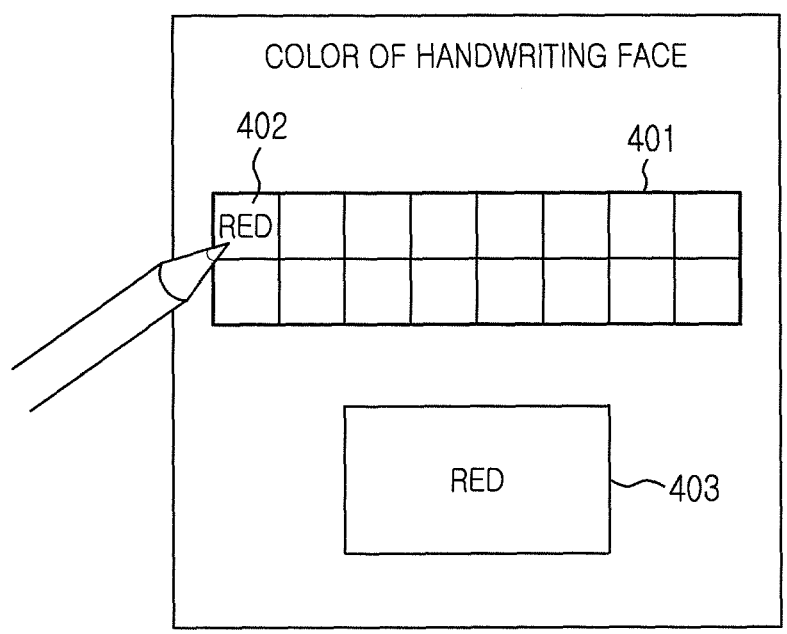
FIG. 4 illustrates an example embodiment of selecting a color of a handwriting face according to embodiments of the present invention.

FIG. 4 illustrates an example embodiment of selecting a color of a handwriting face according to embodiments of the present invention.

First, although not illustrated in FIG. 4, a user selects a menu of a handwriting face to select a color of the handwriting face. If the menu of the handwriting face is selected by the user, a portable terminal displays respective buttons for a texture of the handwriting face, the kind of the handwriting face, and the color of the handwriting face on a display unit of the portable terminal so that the user can select the texture of the handwriting face, the kind of the handwriting face, and the color of the handwriting face. After that, if the user selects the button for the color of the handwriting face to set the color of the handwriting face, as illustrated in FIG. 4, the portable terminal displays various colors of the handwriting face on the display unit. Here, the color of the handwriting face can be previously stored in the portable terminal, or a new color of the handwriting face can be downloaded and stored using a particular application.

If the button for the color of the handwriting face is selected by the user, the portable terminal can display the color of the handwriting face and receive a selection of a particular color of the handwriting face from the user. FIG. 4 illustrates an example embodiment of displaying a color of a handwriting face to receive a selection of a particular color of the handwriting face from the user. As illustrated in FIG. 4, the portable terminal displays various colors of the handwriting face. As in an example embodiment illustrated in FIG. 4, if the portable terminal receives a selection of red 402 as the color of the handwriting face from the user, the portable terminal displays the color (i.e., red 402) selected by the user under the display unit so that the user can identify the selected color (i.e., red 402). In this example embodiment, because the portable terminal receives the selection of red 402 from the user, the portable terminal displays red 402 under the display unit as denoted by reference numeral 403.

Figure 5:
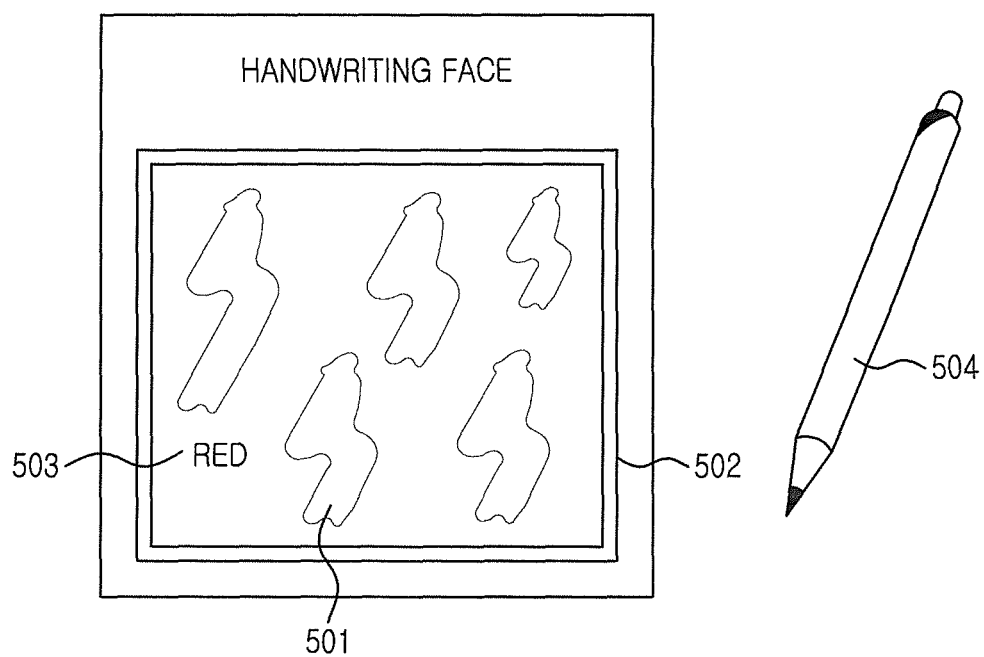
FIG. 5 illustrates an example embodiment of displaying a handwriting face selected by a user according to embodiments of the present invention.

FIG. 5 is a diagram illustrating an example embodiment of displaying a handwriting face selected by a user according to embodiments of the present invention.

As illustrated in FIG. 5, a handwriting face displayed on a display unit of a portable terminal has a coarse texture 501 as a texture of the handwriting face, and has a whiteboard 502 as the kind of the handwriting face, and has a red background 503 as a color of the handwriting face. That is, that the handwriting face displayed on the display unit of the portable terminal has the coarse texture 501 represents that the coarse texture 501 is selected by a user among various textures of the handwriting face. Also, that the handwriting face displayed on the display unit of the portable terminal has the whiteboard 502 represents that the whiteboard 502 is selected by the user among various kinds of the handwriting face. In the same meaning, that the handwriting face displayed on the display unit of the portable terminal has the red background 503 represents that the red background 503 is selected by the user among various colors of the handwriting face.

In the above example of FIG. 5, the portable terminal displays the handwriting face set by the user (i.e., the whiteboard 502 of the coarse texture 501 and the red background 503) on the display unit. After that, if the portable terminal receives an input of certain information from a handwriting tool 504 of an input device set by the user, the portable terminal synthesizes a sound matching with the whiteboard 502 of the coarse texture 501 and the red background 503 and a sound that mimics a particular handwriting tool set by the user, and outputs a sound effect synthesizing the sound matching with the whiteboard 502 of the coarse texture 501 and the red background 503 and the sound that mimics the particular handwriting tool 504. For example, if the user sets a board marker of a thick thickness as the handwriting tool 504, the portable terminal outputs a sound effect synthesizing the sound that mimics the whiteboard 502 of the coarse texture 501 and the red background 503 and a sound matching with the board marker 504 of the thick thickness. That is, the portable terminal outputs a sound effect that mimics an actual handwriting operation as if the user inputs certain information to the whiteboard 502 of the coarse texture 501 and the red background 503 with the board marker 504 of the thick thickness in reality. As described above, the portable terminal may read each of the sound matching with the particular handwriting tool and the sound matching with the handwriting face and output a sound effect synthesizing the read sounds, or the portable terminal may previously store a sound effect matching with each combination of the kind and thickness of the handwriting tool and the texture and kind of the handwriting face, read the sound effect matching with the each combination, and output the read sound effect. In the present invention, though the sound effect is outputted from the portable terminal that is one type of an electronic device, the user can hear the sound effect as if he/she inputs using real tool and background, so there is an advantage of satisfying various desires of the user.

Figure 6:
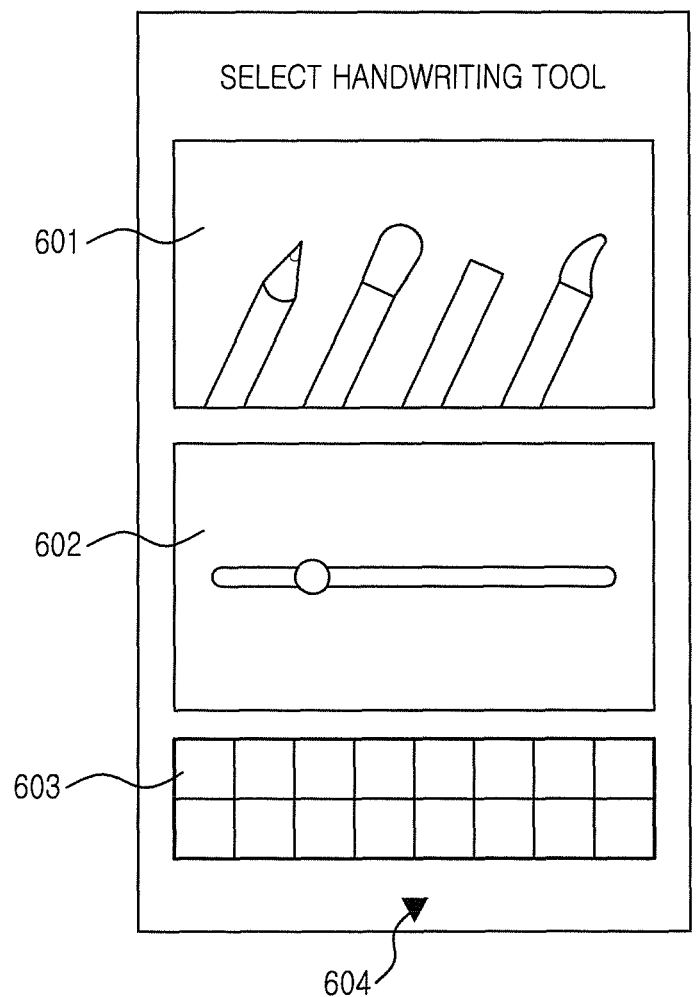
FIG. 6 illustrates an example embodiment of selecting a handwriting tool of an input device according to embodiments of the present invention.

FIG. 6 illustrates an example embodiment of selecting a handwriting tool of an input device according to embodiments of the present invention.

First, although not illustrated in FIG. 6, a user selects a menu of a handwriting tool to select the handwriting tool. If the menu of the handwriting tool is selected by the user, as illustrated in FIG. 6, a portable terminal displays respective setup windows for the kind of the handwriting tool, a thickness of the handwriting tool, and a color of the handwriting tool on a display unit of the portable terminal so that the user can select the kind of the handwriting tool, the thickness of the handwriting tool, and the color of the handwriting tool.

A description is made below in detail for the setup windows capable of selecting the kind of the handwriting tool of the input device, the thickness of the handwriting tool, and the color of the handwriting tool. First, various kinds of the handwriting tool stored in the portable terminal are displayed in a setup window 601 configured to set the kind of the handwriting tool of the input device. For example, because a pencil, a fountain pen, a ball pen, a felt-tipped pen, a board marker, a chalk and the like have been previously stored as the kind of the handwriting tool of the input device, if receiving a selection of a particular kind from the user, the portable terminal can use the selected particular kind as the handwriting tool.

Also, a button for adjusting the thickness of the handwriting tool is displayed in a setup window 602 capable of setting the thickness of the handwriting tool of the input device. By sliding the button displayed in the setup window 602 for setting the thickness of the handwriting tool, the user can adjust the thickness of the handwriting tool thinly or thickly according to user's fancy. Accordingly, if the portable terminal receives a selection of a particular thickness of the handwriting tool from the user, the portable terminal can use the selected particular thickness as the thickness of the handwriting tool. As the user sets the thickness of the handwriting tool to be thinner, the portable terminal outputs a sound effect of a higher frequency.

Also, various colors of the handwriting tool are displayed in a setup window 603 for setting the color of the handwriting tool of the input device so that the user can select a particular color as the color of the handwriting tool. Also, in a case where all colors cannot be displayed on the display unit of the portable terminal, the portable terminal has desirably a particular button 604 so that, if receiving a selection of the particular button 604 from the user, the portable terminal can display various colors that have not yet been displayed on the display unit. The aforementioned kind of the handwriting tool may be previously stored in the portable terminal, or the new kind of the handwriting tool may be downloaded and stored using a particular application.

Figure 7A:
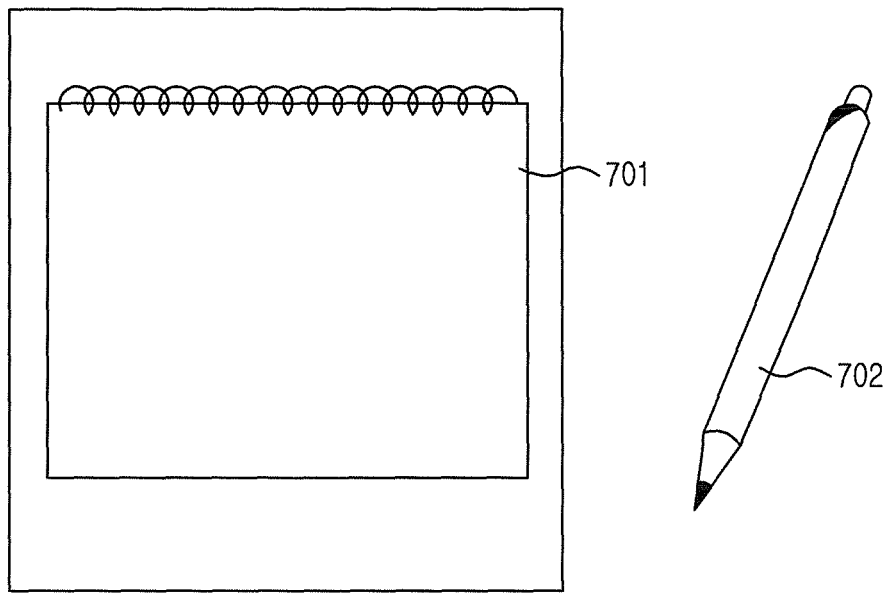
FIGS. 7A and 7B illustrate an example embodiment of outputting a sound effect when a user inputs certain information to a set handwriting face with a set handwriting tool of an input device according to embodiments of the present invention.
Figure 7B:
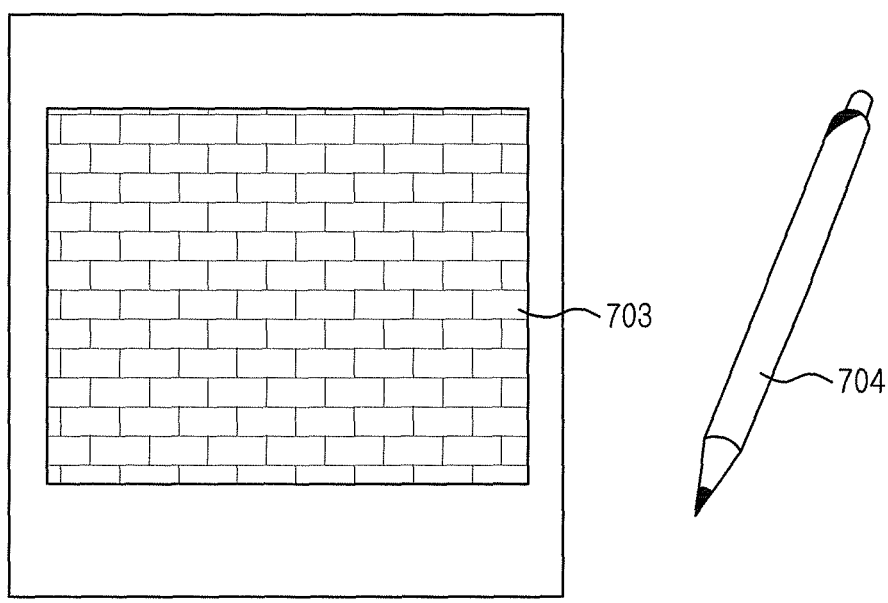

FIGS. 7A and 7B are diagrams illustrating an example embodiment of outputting a sound effect when a user inputs certain information to a set handwriting face with a set handwriting tool of an input device according to an example embodiment of the present invention.

In FIG. 7A, it is assumed that a handwriting face 701 of a portable terminal is set as a white paper of a smooth texture, and a handwriting tool 702 of an input device is set as a black pencil of a thick thickness. As illustrated in FIG. 7A, if a user inputs certain information to the set handwriting face 701 with the set handwriting tool 702 of the input device, the portable terminal senses the input from the input device. That is, the portable terminal senses the input from the handwriting tool 702 for inputting the certain information to the handwriting face 701 of the portable terminal. After that, the portable terminal identifies the handwriting tool 702 of the input device. In detail, the portable terminal displays certain information reflecting the kind of the handwriting tool 702, a thickness of the handwriting tool 702, a color of the handwriting tool 702 and the like on a display unit, and outputs a sound effect matching with the handwriting tool 702. In the aforementioned example, the portable terminal identifies that the handwriting tool 702 that intends to input certain information to the handwriting face 701 is the black pencil of the thick thickness. At the same time, the portable terminal identifies the handwriting face 701 currently displayed on the display unit. In the aforementioned example, the portable terminal identifies that the set handwriting face 701 is the white paper of the smooth texture.

If the portable terminal identifies the handwriting face 701 and the handwriting tool 702, the portable terminal reads a first sound matching with the set handwriting face 701 stored in the portable terminal, reads a second sound matching with the set handwriting tool 702 stored in the portable terminal, and outputs a sound effect synthesizing the read first sound and second sound. That is, the portable terminal outputs a sound effect that mimics an actual handwriting operation as if the user inputs certain information to the white paper of the smooth texture with the black pencil of the thick thickness. As described above, the portable terminal may read the respective first and second sounds and output a sound effect synthesizing the read first and second sounds, or the portable terminal may previously store a sound effect matching with each combination of the kind and thickness of the handwriting tool and the texture and kind of the handwriting face, read the sound effect matching with the each combination, and output the read sound effect. For example, the portable terminal may output a sound effect matching with a combination of a whiteboard of a coarse texture and a board marker of a thin thickness. Accordingly, there is an advantage that the user can hear a sound effect as if he/she inputs certain information to the white paper of the smooth texture with the black pencil having a relatively thick thickness.

In FIG. 7B, it is assumed that a handwriting face 703 of a portable terminal is set as a brown brick of a coarse texture, and a handwriting tool 704 of an input device is set as a white chalk of a thick thickness. As illustrated in FIG. 7B, if a user inputs certain information to the set handwriting face 703 with the set handwriting tool 704 of the input device, the portable terminal senses the input from the input device. That is, the portable terminal senses the input from the handwriting tool 704 for inputting the certain information to the handwriting face 703 of the portable terminal. After that, the portable terminal identifies the handwriting tool 704 of the input device. In detail, the portable terminal displays certain information reflecting the kind of the handwriting tool 704, a thickness of the handwriting tool 704, a color of the handwriting tool 704 and the like on a display unit, and outputs a sound effect matching with the handwriting tool 704. In the aforementioned example, the portable terminal identifies that the handwriting tool 704 that intends to input certain information to the handwriting face 703 is the white chalk of the thick thickness. At the same time, the portable terminal identifies the handwriting face 703 currently displayed on the display unit. In the aforementioned example, the portable terminal identifies that the set handwriting face 703 is the brown brick of the coarse texture. If the portable terminal identifies the handwriting face 703 and the handwriting tool 704, the portable terminal reads a first sound matching with the set handwriting face 703 stored in the portable terminal, reads a second sound matching with the set handwriting tool 704 stored in the portable terminal, and outputs a sound effect synthesizing the read first sound and second sound. That is, the portable terminal outputs a sound effect that mimics an actual handwriting operation as if the user inputs certain information to the brown brick of the coarse texture with the white chalk having a thick thickness in reality. Accordingly, there is an advantage that the user can hear a sound effect as if he/she actually inputs certain information to the brown brick of the coarse texture with the white chalk having the thick thickness. As described above, the portable terminal may read the respective first and second sounds and output a sound effect synthesizing the read first and second sounds, or the portable terminal may previously store a sound effect matching with each combination of the kind and thickness of the handwriting tool and the texture and kind of the handwriting face, read the sound effect matching with the each combination, and output the read sound effect.

Figure 8:
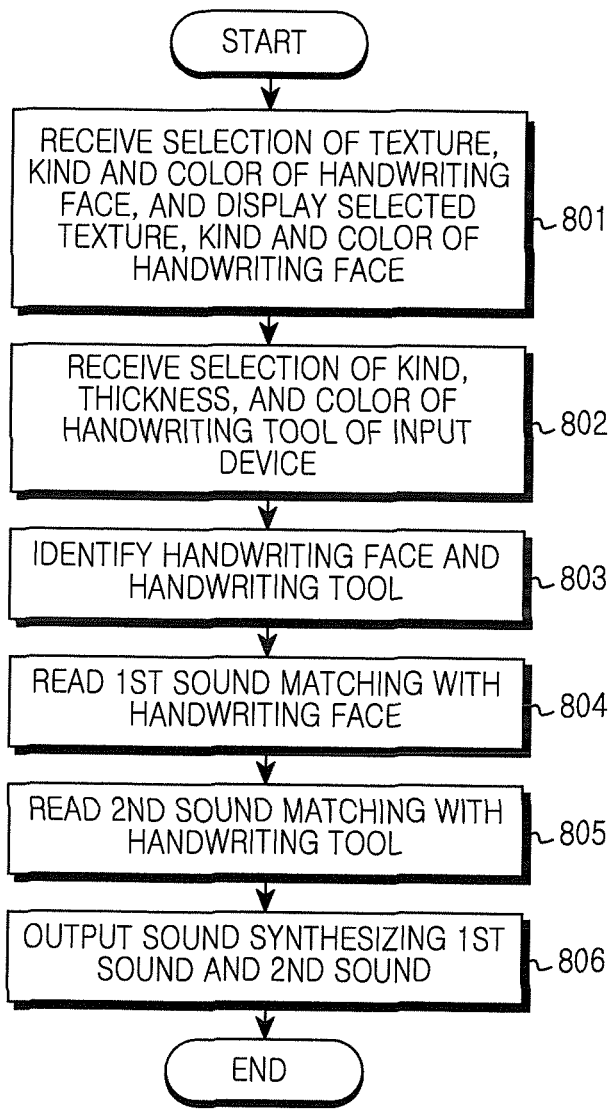
FIG. 8 is a flowchart illustrating an operation method of a portable terminal according to embodiments of the present invention.

FIG. 8 illustrates an example method of a portable terminal according to embodiments of the present invention.

As illustrated in FIG. 8, in step 801, the portable terminal receives a selection of a texture, kind, and color of a handwriting face, and displays the selected texture, kind, and color of the handwriting face on a display unit. In detail, the portable terminal receives the selection of the texture, kind, and color of the handwriting face from a user, combines the selected texture, kind and color of the handwriting face, and displays the combined texture, kind and color of the handwriting face on the display unit. For example, when assuming that the portable terminal receives a selection of a coarse texture as the texture of the handwriting face from the user, a selection of a board as the kind of the handwriting face from the user, and a selection of black as the color of the handwriting face from the user, the portable terminal displays the handwriting face of the black-colored board of the coarse texture on the display unit.

After receiving the selection of the texture, kind and color of the handwriting face from the user and displaying the selected texture, kind and color of the handwriting face, in step 802, the portable terminal receives a selection of the kind, thickness and color of a handwriting tool of an input device. In detail, the portable terminal receives the selection of the kind, thickness, color and the like of the handwriting tool of the input device to be input to the handwriting face of the portable terminal. For example, when assuming that the portable terminal receives a selection of a chalk as the kind of the handwriting tool from the user, a selection of a thick thickness as the thickness of the handwriting tool from the user, and a selection of white as the color of the handwriting tool from the user, henceforth, if the user inputs certain information to the set handwriting face with the set handwriting tool, the user can visually identify that the input has been performed with the white-colored chalk having the thick thickness and also, can audibly identify a sound effect synthesized with a sound matching with the set handwriting face (i.e., the black-colored board of the coarse texture).

After that, in step 803, the portable terminal identifies the handwriting face and the handwriting tool. In detail, why the portable terminal identifies the handwriting face and the handwriting tool is to read a sound matching with the set handwriting face and a sound matching with the set handwriting tool and output a sound effect synthesizing these sounds in the portable terminal. In the aforementioned example, the portable terminal identifies that the handwriting face currently displayed on the display unit is the black-colored board of the coarse texture and identifies that the handwriting tool is the white-colored chalk having the thick thickness.

After identifying the handwriting face and the handwriting tool, in step 804, the portable terminal reads a first sound matching with the handwriting face. In detail, the portable terminal identifying the handwriting face in step 803 reads the first sound matching with the handwriting face stored in the portable terminal in order to output a sound matching with the selected handwriting face. In the aforementioned example, the portable terminal identifies that the handwriting face currently displayed on the display unit is the black-colored board of the coarse texture, and reads a sound matching with the black-colored board of the coarse texture stored in the portable terminal in order to output a sound matching with the black-colored board of the coarse texture.

After that, in step 805, the portable terminal reads a second sound matching with the handwriting tool. In detail, the portable terminal identifying the handwriting tool in step 803 reads the second sound matching with the handwriting tool stored in the portable terminal in order to output a sound matching with the selected handwriting tool. In the aforementioned example, the portable terminal identifies that the handwriting tool for inputting certain information to the handwriting face is the white-colored chalk having the thick thickness, and reads a sound matching with the white-colored chalk having the thick thickness stored in the portable terminal in order to output a sound matching with the white-colored chalk having the thick thickness.

After reading the first sound and the second sound, in step 806, the portable terminal outputs a sound effect synthesizing the read first and second sounds. In detail, if the portable terminal synthesizes respective sounds corresponding to the handwriting face and the handwriting tool, which are virtually set by the user, and outputs the synthesized sound, the portable terminal can output a sound effect that mimics an actual handwriting operation as if the user inputs certain information to the handwriting face with the handwriting tool. In the aforementioned example, if the user inputs certain information to the handwriting face displayed on the display unit of the portable terminal with the handwriting tool of the input device, the portable terminal outputs a sound effect as if the user inputs certain information to the black-colored board of the coarse texture with the white-colored chalk having the thick thickness in reality.

In the flowchart of FIG. 8, the description has been made in which the portable terminal receives a selection of a particular handwriting tool from a user after receiving a selection of a particular handwriting face from the user. This does not intend to limit the scope and spirit of the present invention, and the portable terminal may receive the selection of the particular handwriting face from the user after receiving the selection of the particular handwriting tool from the user.

Also, in the flowchart of FIG. 8, the description has been made in which the portable terminal reads a second sound matching with a handwriting tool after reading a first sound matching with a handwriting face. This does not intend to limit the scope and spirit of the present invention, and the portable terminal may read the first sound matching with the handwriting face after reading the second sound matching with the handwriting tool.

Also, as mentioned above in detail through FIG. 1, a user may select a particular handwriting face and a particular handwriting tool by means of a portable terminal, but the user may select the particular handwriting face and the particular handwriting tool by means of an input device supporting a local area communication with the portable terminal.

Figure 9:
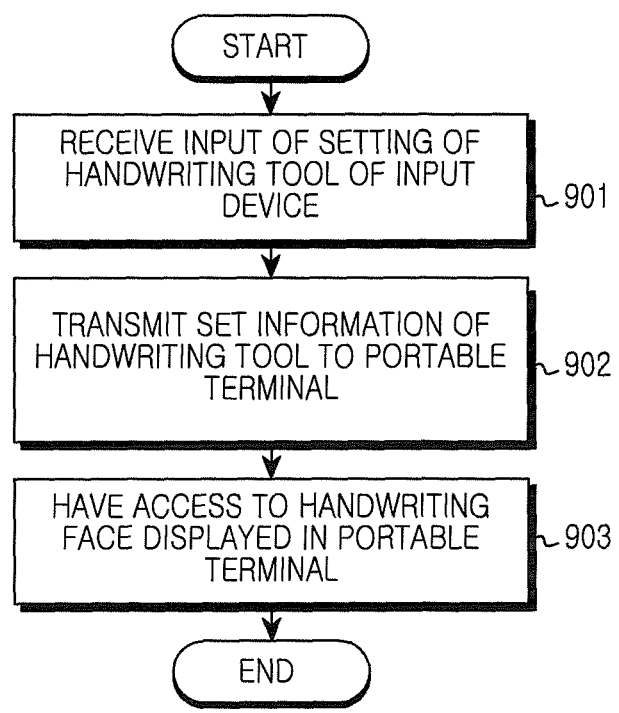
FIG. 9 illustrates an example method of an input device according to embodiments of the present invention.

FIG. 9 is a flowchart illustrating an operation method of an input device according to embodiments of the present invention.

As illustrated in FIG. 9, in step 901, the input device receives an input of setting of a handwriting tool of the input device from a user. In detail, the user does not directly input the setting of the handwriting tool by means of a portable terminal, but the user can set the handwriting tool by means of the input device supporting a local area communication with the portable terminal. For example, the user can select a button and the like provided at one side of the handwriting tool and select the kind, thickness, color and the like of the handwriting tool, even without having direct access to the portable terminal to set the handwriting tool.

After that, in step 902, the input device transmits information of the handwriting tool set by the user, to the portable terminal. In detail, because the portable terminal and the input device are devices supporting local area communication, the input device can transmit the information of the handwriting tool input from the user, to the portable terminal through the local area communication.

After transmitting the information of the handwriting tool selected by the user to the portable terminal, in step 903, the input device has access to a handwriting face displayed in the portable terminal and attempts input to the handwriting face. Accordingly, from the user perspective, there is an advantage that the user can set the kind, thickness, color and the like of the handwriting tool through the button and the like provided in the input device, even without directly inputting the information of the handwriting tool of the input device to the portable terminal.

In the flowchart of FIG. 9, only order of setting a handwriting tool of an input device is illustrated, but it is undoubted that a user may set a particular handwriting face by means of the input device. That is, the user may specify the handwriting face by means of a button and the like provided in the input device, instead of directly inputting a texture, kind, color and the like of the handwriting face through the portable terminal as mentioned above.

Figure 10:
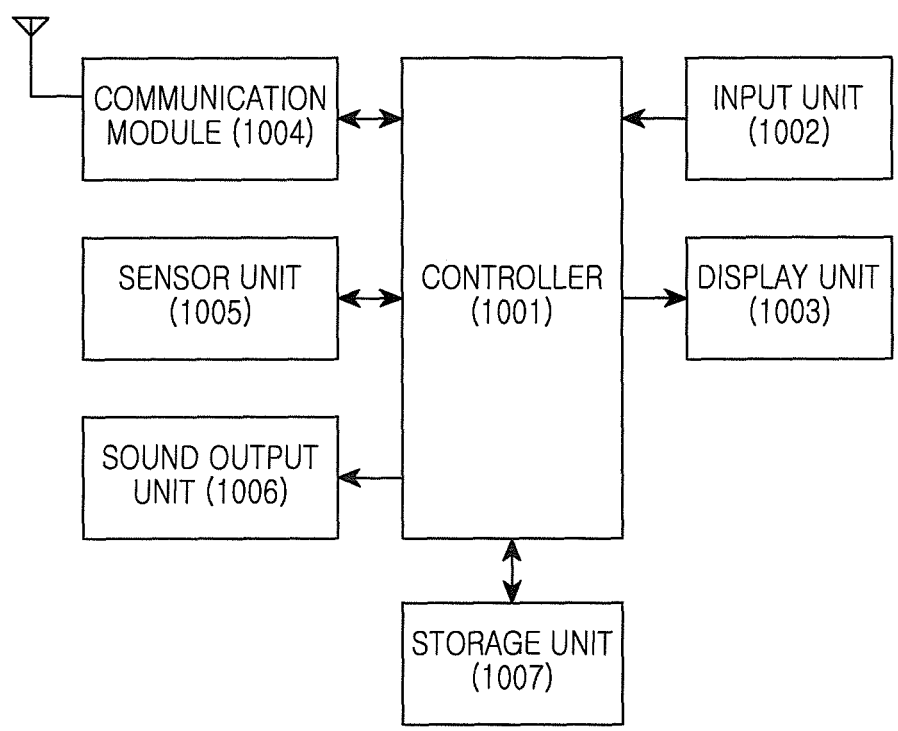
FIG. 10 illustrates an example portable terminal according to embodiments of the present invention.

FIG. 10 illustrates an example portable terminal according to an example embodiment of the present invention.

As illustrated in FIG. 10, the portable terminal according to embodiments of the present invention can include a controller 1001, an input unit 1002, a display unit 1003, a communication module 1004, a sensor unit 1005, a sound output unit 1006, and a storage unit 1007.

The controller 1001 controls the general operation of the portable terminal. For example, the controller 1001 identifies a handwriting tool of an input device and a handwriting face displayed on the display unit 1003, identifies the kind and thickness of the handwriting tool, and identifies a texture and kind of the handwriting face. After that, the controller 1001 reads a first sound matching with the kind and thickness of the handwriting tool, reads a second sound matching with the texture and kind of the handwriting face, and synthesizes the read first and second sounds.

The input unit 1002 provides input data generated by user's selection, to the controller 1001. For example, the input unit 1002 receives a selection of a menu of a handwriting face, receives a selection of each any one of at least one or more textures, kinds, and colors of the handwriting face, receives a selection of a menu of a handwriting tool of an input device, and receives a selection of each any one of at least one or more kinds, thickness, and colors of the handwriting tool.

The display unit 1003 displays state information of the portable terminal, a menu screen, and story information according to control of the controller 1001. For example, the display unit 1003 displays at least one or more textures, kinds, and colors of the handwriting face, and displays the handwriting face combining the selected texture, kind, and color. Also, the display unit 1003 displays at least one or more kinds, thickness, and colors of the handwriting tool.

The communication module 1004 processes a signal transmitted/received through an antenna for the sake of voice and data communication. For example, the communication module 1004 receives a selection of a texture, kind, and color of a handwriting face from an input device through a local area communication with the input device, and the communication module 1004 receives a selection of the kind, thickness and color of a handwriting tool from the input device through the local area communication with the input device.

The sensor unit 1005 senses an input from the input device.

The sound output unit 1006 processes an audio signal input/output through the portable terminal. For example, the sound output unit 1006 outputs a synthesized sound, and outputs a sound effect as if the user inputs certain information to the handwriting face with the handwriting tool in reality.

The storage unit 1007 can include a program storage unit and a data storage unit. The program storage unit stores a program for controlling an operation of the portable terminal. The data storage unit stores data generated in execution of a program.

In the aforementioned block construction, the controller 1001 can perform the general function of the portable terminal. In the present invention, these are separately constructed and shown in order to distinguish and describe respective functions. Thus, when a product is actually realized, construction can be such that the controller 1001 can process all of the functions of the portable terminal, or construction can be such that the controller 1001 can process only some of the functions.

Figure 11:
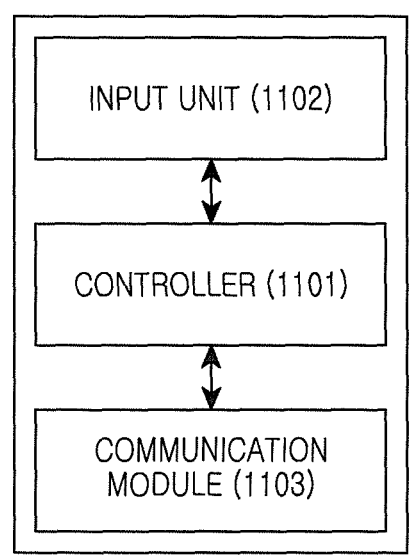
FIG. 11 illustrates an example input device according to embodiments of the present invention.

FIG. 11 illustrates an example input device according to embodiments of the present invention.

As illustrated in FIG. 11, the input device according to embodiments of to the present invention can include a controller 1101, an input unit 1102, and a communication module 1103.

The controller 1101 controls the general operation of the input device. For example, the controller 1101 senses an access with a handwriting face displayed in a portable terminal.

The input unit 1102 provides input data generated by user's selection, to the controller 1101. For example, the input unit 1102 receives an input of setting of a handwriting tool of the input device. A touch sensitive display, called as a touch screen, may be used as input unit 1102. In this situation, a touch input may be performed via the touch sensitive display.

The communication module 1103 processes a signal transmitted/received through an antenna for voice and data communication. For example, the communication module 1003 transmits information of a set handwriting tool to the portable terminal.

In the aforementioned block construction, the controller 1101 performs the general function of the input device. In the present invention, these are separately constructed and shown in order to distinguish and describe respective functions. Thus, when a product is actually realized, construction can be such that the controller 1101 can process all of the functions of the input device, or the controller 1101 can process only some of the functions.

Figure 12:
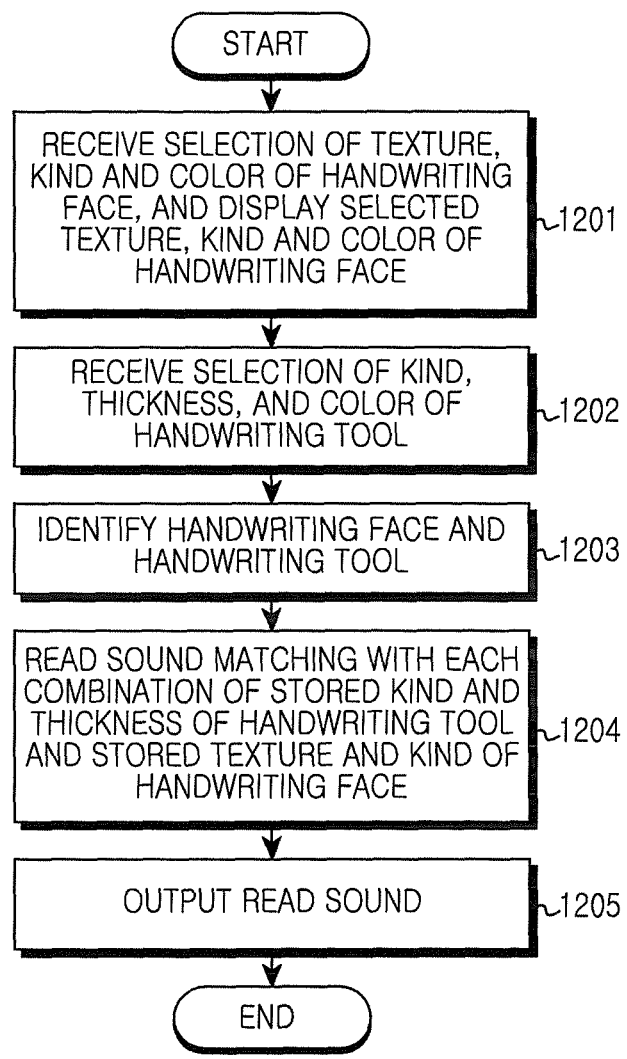
FIG. 12 illustrates an example method of a portable terminal according to embodiments of the present invention.

FIG. 12 illustrates an example method of a portable terminal according to another example embodiment of the present invention.

As illustrated in FIG. 12, in step 1201, the portable terminal receives a selection of a texture, kind, and color of a handwriting face, and displays the selected texture, kind, and color of the handwriting face on a display unit. In detail, the portable terminal receives the selection having the texture, kind, and color of the handwriting face from a user, combines the selected texture, kind and color of the handwriting face, and displays the combined texture, kind and color of the handwriting face on the display unit. For example, when assuming that the portable terminal receives a selection of a smooth texture as the texture of the handwriting face from the user, a selection of a paper as the kind of the handwriting face from the user, and a selection of white as the color of the handwriting face from the user, the portable terminal displays the handwriting face of the white-colored paper of the smooth texture on the display unit.

After receiving the selection having the texture, kind and color of the handwriting face from the user and displaying the selected texture, kind, and color of the handwriting face, in step 1202, the portable terminal receives a selection of the kind, thickness, and color of a handwriting tool of an input device. In detail, the portable terminal receives the selection of the kind, thickness, color, and the like of the handwriting tool of the input device to be input to the handwriting face of the portable terminal. For example, when assuming that the portable terminal receives a selection of a pencil as the kind of the handwriting tool from the user, a selection of a thick thickness as the thickness of the handwriting tool from the user, and a selection of black as the color of the handwriting tool from the user, henceforth, if the user inputs certain information to the set handwriting face with the set handwriting tool, the user can visually identify that the input has been performed with the black-colored pencil having the thick thickness and also, can audibly identify a sound effect synthesized with a sound matching with the set handwriting face (i.e., the white-colored paper of the smooth texture).

After that, in step 1203, the portable terminal identifies the handwriting face and the handwriting tool. In detail, why the portable terminal identifies the handwriting face and the handwriting tool is to output a sound effect matching with each combination of the kind and thickness of the handwriting tool and the texture and kind of the handwriting face. In the aforementioned example, the portable terminal identifies that the handwriting face currently displayed on the display unit is the white-colored paper of the smooth texture, and also identifies that the handwriting tool is the black-colored pencil having the thick thickness.

After identifying the handwriting face and the handwriting tool, in step 1204, the portable terminal reads a sound matching with each combination of the kind and thickness of the handwriting tool and the texture and kind of the handwriting face. In detail, because the portable terminal has stored the sound matching with the each combination of the kind and thickness of the handwriting tool and the texture and kind of the handwriting face, the portable terminal can identify the kind and thickness of the handwriting tool and the texture and kind of the handwriting face and read a sound matching with a combination of the kind and thickness of the handwriting tool and the texture and kind of the handwriting face. In the aforementioned example, the portable terminal identifies that the handwriting face currently displayed on the display unit is the white-colored paper of the smooth texture, identifies that the handwriting tool set by the user is the black-colored pencil having the thick thickness, and reads a sound of when the user inputs certain information to the white-colored paper of the smooth texture with the black-colored pencil of the thick thickness.

If the portable terminal reads the sound matching with each combination of the kind and thickness of the handwriting tool and the texture and kind of the handwriting face, in step 1205, the portable terminal outputs the read sound. In detail, the portable terminal outputs the sound matching with the each combination of the kind and thickness of the handwriting tool and the texture and kind of the handwriting face. In the aforementioned example, the portable terminal outputs a sound effect that mimics an actual handwriting operation as if the user actually inputs certain information to the white paper of the smooth texture with the black-colored pencil of the thick thickness. That is, the present invention has an effect that the user can hear a sound effect as if the sound is generated in reality, by set the handwriting face of the portable terminal and the handwriting tool of the input device according to user's fancy and inputting certain information to the handwriting face with a user's finger or the handwriting tool.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention. Such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An operating method of a portable terminal, the method comprising:
    displaying a list comprising at least a plurality of textures, kinds, and colors of a handwriting face and at least a plurality of kinds, thicknesses, and colors of a handwriting tool;
    determining a handwriting tool used for the input and a handwriting face for displaying by the portable terminal using a user input on the displayed list, wherein the handwriting face comprises a virtual surface simulating a surface onto which a user writes;
    in response to detecting a handwriting operation, outputting a sound that mimics an actual handwriting operation on the portable terminal via a sound output unit of the portable terminal, wherein outputting the sound that mimics the actual handwriting operation comprises:
    reading a first sound matching with a kind and a thickness of the handwriting tool,
    reading a second sound matching with a texture and a kind of the handwriting face,
    synthesizing the first sound and the second sound into a synthesized sound, and
    outputting the synthesized sound, wherein determining the handwriting face to be displayed by the portable terminal comprises:
    selecting a kind of the handwriting face,
    selecting a texture for the determined kind of the handwriting face,
    selecting a color for the determined kind of the handwriting face, and
    combining the selected texture, kind, and color of the handwriting face.

2. The method of claim 1, further comprising receiving a selection of the texture, kind, and color of the handwriting face from an input device through a local area communication with the input device.

3. The method of claim 1, further comprising:
    receiving a selection of a menu from the handwriting tool;
    displaying at least a plurality of stored kinds, thickness and colors of the handwriting tool; and
    receiving a selection of at least one or more of the kind, thickness, and color of the handwriting tool.

4. The method of claim 1, further comprising receiving a selection of the kind, thickness, and color of the handwriting tool from an input device through a local area communication with the input device.

5. The method of claim 1, wherein determining the handwriting tool comprises determining the kind of the handwriting tool and the thickness of the handwriting tool.

6. The method of claim 1, wherein determining the handwriting face comprises determining the texture of the handwriting face and the kind of the handwriting face.

7. The method of claim 1, wherein outputting the sound that mimics the actual handwriting operation comprises:
reading a sound matching with the kind and thickness of the handwriting tool and a sound matching with the texture and kind of the handwriting face; and
outputting the read sounds.

8. An electronic device, the device comprising:
a display unit; and
a controller configured to:
display a list comprising at least a plurality of textures, kinds, and colors of a handwriting face and at least a plurality of kinds, thicknesses, and colors of a handwriting tool,
determine a handwriting tool used for the input and identify a handwriting face for displaying using a user input on the displayed list, wherein the handwriting face comprises a virtual surface simulating a surface onto which a user writes,
read a first sound matching with a kind and a thickness of the handwriting tool,
read a second sound matching with a texture and a kind of the handwriting face,
synthesize the first sound and the second sound into a synthesized sound, and
in response to detecting a handwriting operation, output a sound that mimics an actual handwriting operation via a sound output unit of the electronic device,
wherein the controller is configured to identify the handwriting face by:
selecting a kind of the handwriting face,
selecting a texture for the determined kind of the handwriting face,
selecting a color for the determined kind of the handwriting face, and
combining the selected texture, kind, and color of the handwriting face.

9. The device of claim 8, further comprising a communication device configured to receive a selection of a texture, kind, and color of the handwriting face from an input device through a local area communication with the input device.

10. The device of claim 8, further comprising:
an input unit configured to receive a selection of a menu from the handwriting tool, and receiving a selection of at least one or more kinds, thickness, and colors of the handwriting tool; and
a display unit configured to display the at least plurality of kinds, thickness and colors of the handwriting tool.

11. The device of claim 8, further comprising a communication device configured to receive a selection of a kind, thickness, and color of the handwriting tool from an input device through a local area communication with the input device.

12. The device of claim 8, wherein the controller is configured to determine the kind of the handwriting tool and the thickness of the handwriting tool.

13. The device of claim 8, wherein the controller is configured to determine the texture of the handwriting face and the kind of the handwriting face.

14. The device of claim 8, wherein the controller is configured to read a first sound matching the kind and thickness of the handwriting tool and a second sound matching the texture and kind of the displayed handwriting face, and wherein the sound output unit is configured to output the first sound and the second sound.

15. A non-transitory, computer-readable medium comprising one or more executable instructions that, when executed by a processor, cause the processor to:
display a list comprising at least a plurality of textures, kinds, or colors of a handwriting face and at least a plurality of kinds, thicknesses, and colors of a handwriting tool;
determine a handwriting tool used for the input and a handwriting face for displaying using a user input on the displayed list, wherein the handwriting face comprises a virtual surface simulating a surface onto which a user writes;
read a first sound matching the kind and thickness of the handwriting tool;
read a second sound matching with the texture and kind of the handwriting face;
synthesize the first sound and the second sound into a synthesized sound; and
output the synthesized sound that mimics an actual handwriting operation via a sound output unit,
wherein the one or more executable instructions are further configured to determine the handwriting face by:
selecting a kind of the handwriting face,
selecting a texture of the determined kind of the handwriting face,
selecting a color for the determined kind of the handwriting face, and
combining the selected texture, kind, and color of the handwriting face.

16. The non-transitory, computer-readable medium of claim 15, wherein the one or more executable instructions are further configured to identify the kind of the handwriting tool and a thickness of the handwriting tool.

17. The non-transitory, computer-readable medium of claim 15, wherein the one or more executable instructions are further configured to identify a texture of the handwriting face and the kind of the handwriting face.

* * * * *